Oct. 12, 1965    E. L. ABEL ETAL    3,212,046
FLEXIBLE ELECTRICAL JUMPER CONNECTIONS
Filed Sept. 21, 1962
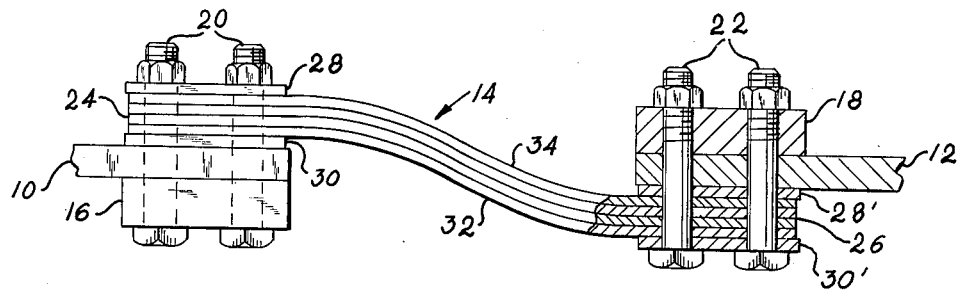
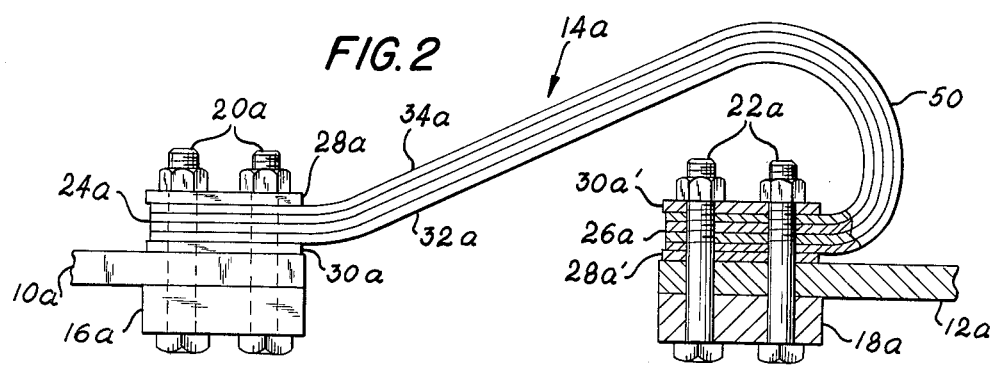
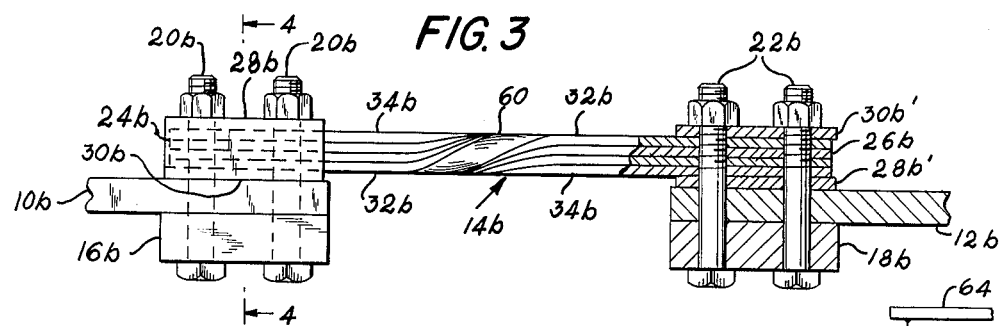
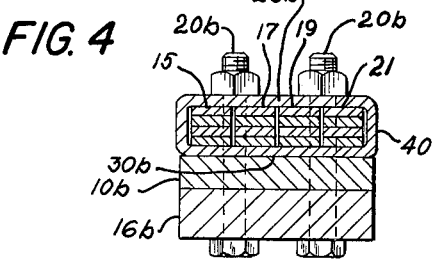
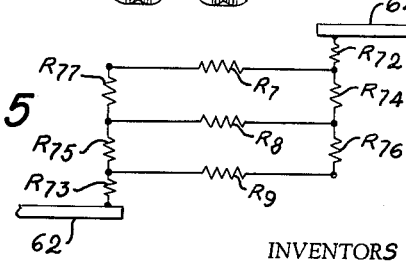
INVENTORS
EDMOND L. ABEL
JULIUS G. SPANYI
BY Howard A. Reiter
ATTORNEY

United States Patent Office 3,212,046
Patented Oct. 12, 1965

3,212,046
FLEXIBLE ELECTRICAL JUMPER
CONNECTIONS
Edmond L. Abel, Norwalk, and Julius G. Spanyi, South Norwalk, Conn., assignors to Burndy Corporation, a corporation of New York
Filed Sept. 21, 1962, Ser. No. 225,233
2 Claims. (Cl. 339—1)

Our invention relates to electrical connections between supported bus bars which accommodate the longitudinal expansion and contraction of the bars caused by variations in ambient conditions. The invention relates particularly to methods and means for improving the flow and distribution of current through these connections.

It is an object of the present invention to provide a more uniform distribution of current flow through the cross-section of a jumper cable. Jumper cables conventionally consist of a plurality of thin flexible conductive strips laminated together at their ends, or a flat stranded cable, which may be fastened at each end to a bus bar terminal. In present usage, a single layer or surface of a flat jumper is conventionally held in direct contacting relation with the connected bus bars, while the remainder of the jumper is disposed above the common contacting surface, forming a number of increasingly resistive parallel current paths. Current density, i.e., current flow per unit cross-section area, in connections of this type has been found to be greatest in the contacting layer and those closest to it, these being the paths of least electrical resistance for a jumper material of uniform resistivity. Electrical heating due to the current flow in these layers may assume dangerous proportions in a given jumper; although the same total current flow would cause heating well within allowable limits if more uniformly distributed through the available paths in the jumper. By achieving more homogeneous current distribution in jumper cables this invention makes possible lowering of temperature design requirements, utilization of less expensive materials, and reduction of the quantity of material required for jumpers carrying a given load.

These and other objects, features and advantages of this invention will be made more apparent by reference to the following specification taken in conjunction with the accompanying drawings in which:

FIGURE 1 is a side elevation of two supported bus bars joined together by a jumper in accordance with our invention;

FIGURE 2 is a similar view of a modification;

FIGURE 3 is a similar view of a further modification showing two bus bars positioned for movement toward each other;

FIGURE 4 is a cross sectional view of the jumper of FIGURE 3 taken in plane 4—4;

FIGURE 5 is a schematic, equivalent electrical circuit representation of a jumper connection formed in accordance with this invention.

Referring now more particularly to FIGURE 1 of the drawings, reference numerals 10 and 12 designate the adjacent terminal portions of two longitudinally supported bus bars connected by flexible jumper cable 14. The ends 24 and 26 of the jumper are secured to the bar terminals which are mounted on support elements 16 and 18 respectively. Bolts 20 and 22 passing through the support elements, bus bars, and jumper secure the three together in a conventional unitary structure at each terminal, although the jumper may be fastened to the bars independently of the supports.

Mounting plates 28 and 30 are provided on opposite surfaces of the jumper at the ends 24 and 26 to retain the shape of the ends and distribute the compressive forces applied by the bolts 20 and 22. The plates may be individual members separately secured to jumper or may be the opposite sides of unitary ferrules or sleeves such as 40, shown in FIGURE 4, which enclose the ends. Bonding the individual laminations of the jumper into an integral structure, as by sweat soldering under pressure may eliminate the need for plates 28 and 30 altogether.

We have found that more homogeneous current flow through a flat flexible jumper may be achieved by causing the principal flow path to extend between its opposite sides. FIGURE 5 illustrates, in schematic equivalent circuit form, current flow in a jumper cable connected in accordance with this invention. Resistances R7, R8 and R9 represent three conductive strips or layers of a laminated jumper cable connecting two bus bar terminals 62 and 64. The resistances are substantially identical. Resistances R73 and R72 represent the contact resistance between terminals 62 and 64 and jumper conductors R9 and R7, respectively, at their points of contact. Resistances R74 through R77 represent the contact resistance between the individual jumper conductors at their connected ends. Interconductor contact resistance is considered at the end portions, which are clamped into intimate mechanical and electrical contact. It can be seen from the drawing that the total series resistance along each possible path between terminals 62 and 64 is the same regardless of the path chosen. The path through R9, for example, includes R73, R9, R76, R74 and R72, while if R7 is chosen as the path, R7, R75 and R77 are substituted for R9, R76 and R74 respectively but the total resistance remains the same. However, if terminals 62 and 64 were both connected to R9, the resistance of that path would include R73, R9 and a contact resistance similar to R72, while the total resistance through R7 would include R73, R75, R77, R7, R72, R74, R76 and a similar contact resistance.

Thus, the current flow path of the jumper 14 shown in FIGURE 1, extends from jumper surface 32 in contact with plate 30 at end 24 through the thickness and length of the jumper to surface 34 in contact with plate 28 at end 26. Since all current must eventually flow through the entire jumper cross-section from one side to the other, more uniform current distribution through the cross-section is achieved as described above. It is at least assured that at points intermediate its ends, the current flow through a unit cross-section area in each layer of a laminated jumper, for example, will be equal to the flow through a similar area at points in each of the other layers, indicating that the conductive layers are each carrying an equal share of the electrical load.

In FIGURE 2, parts corresponding to those illustrated in FIGURE 1 are identically numbered, with an "a" suffix added. Here, full cross-section current flow through jumper 14a is achieved by providing a longitudinal return bend, as at 50, so the jumper surface 34a is in contact with bus bar 12a at end 26a through plate 28a while surface 32a similarly contacts the bus bar at end 24a.

In FIGURE 3 corresponding parts are again identically numbered with a distinguishing "b" suffix added. In this embodiment the laminated jumper cable 14b has been longitudinally divided into four longitudinal sections 15, 17, 19 and 21. It should be noted that the number four is exemplary only, and the cable may be divided into as many sections as may be consistent with the cable material and strength in view of the described structure. Each longitudinal section is subjected to a 180° axial twist as shown generally at 60 in FIGURE 3 so that surface 32b which is on the bottom of the cable at end 24b, is on the top at end 26b. The ends of the twisted sections may be held together by a conductive ferrule or sleeve such as 40. The ends may be assembled to the sleeve by axially inserting them therein or by forming the sleeve of sheet metal wrapped around them and fastened in position by any suitable means, such as brazing for example.

When connected as shown current flow is directed through the path extending from jumper surface 32b at end 24b through the jumper to surface 34b at end 26b. Two terminal surfaces facing in substantially the same direction may thus be connected to the opposite sides of a jumper cable of minimum length.

We have thus described our invention but we desire it to be understood that it is not confined to the particular forms or usages shown and described, the same being merely illustrative, and that the invention may be carried out in other ways without departing from the spirit of our invention; therefore, the right is broadly claimed to employ all equivalent instrumentalities coming within the scope of the appendant claims by means of which objects of this invention are attained and new results accomplished, as it is obvious that the particular embodiments herein shown and described are only some of the many that can be employed to obtain these objects and accomplish these results.

We claim:

1. A jumper connection for carrying electrical current through a jumper assembly between two spaced-apart terminal surfaces which face in substantially the same direction, wherein the jumper assembly is in surface area contact with each terminal surface, comprising: a two-sided jumper assembly including a plurality of longitudinally extending coextensive conductors each having a pair of opposite surfaces; said conductors being disposed in substantially coplanar, side-by-side relationship; each conductor having a 180° axial twist intermediate the ends thereof to position an end portion of one surface thereof and an end of the opposite surface thereof on substantially the same side of said jumper assembly; means holding together corresponding ends of said conductors to form a substantially unitary assembly; and means coupling one of said terminals to one surface of said jumper and the other terminal to the other surface of said jumper to cause current to flow uniformly through substantially the entire cross-section of said jumper from one surface thereof to the other.

2. A jumper connection for carrying electrical current through a jumper assembly between two spaced-apart terminal surfaces which face in substantially the same direction, wherein the jumper assembly is in surface area contact with each terminal surface, comprising: a two-sided jumper assembly including a plurality of longitudinally extending coextensive conductors each having a pair of opposite surfaces; each conductor comprising a composite laminar structure formed of a plurality of conductive strips disposed in parallel stacked relationship, one outermost strip forming one surface of said conductor and another outermost strip forming the opposite surface thereof; said conductors being disposed in substantially coplanar side-by-side relationship; each conductor having a 180° axial twist intermediate the ends therof to position an end portion of one surface thereof and an end portion of the opposite surface thereof on substantially the same side of said jumper assembly; means holding together corresponding ends of said conductors to form a substantially unitary assembly; and means coupling one of said terminals surfaces to one surface of said jumper and the other terminal surface to the other surface of said jumper to cause current to flow uniformly through substantially the entire cross-section of said jumper from one surface thereof to the other.

References Cited by the Examiner
UNITED STATES PATENTS

| | | | |
|---|---|---|---|
| 302,377 | 7/84 | Bentley | 174—34 |
| 891,343 | 6/08 | Keller | 339—9 |
| 1,181,250 | 5/16 | Renshaw | 339—250 |
| 1,552,619 | 9/25 | Klugh | 339—112 |
| 2,310,684 | 2/43 | Farry | 174—34 X |

JOSEPH D. SEERS, *Primary Examiner.*